(No Model.)
J. L. STEWART.
INCANDESCENT GAS BURNER.
No. 417,524. Patented Dec. 17, 1889.
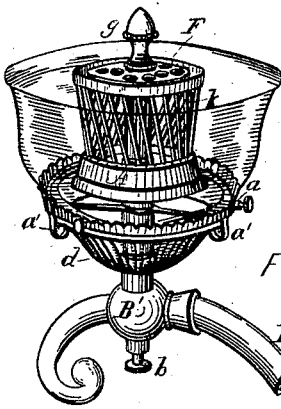
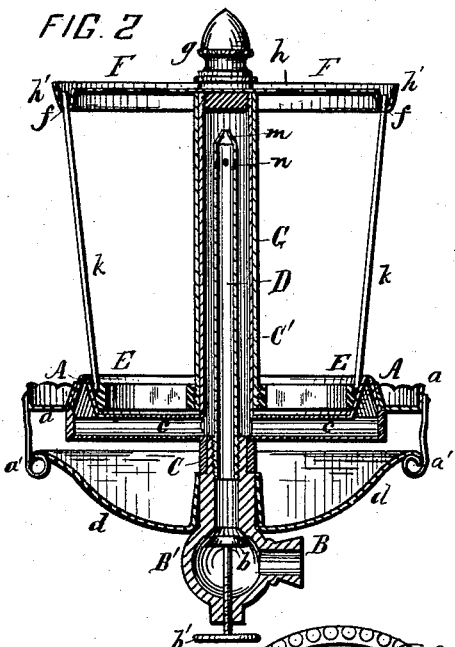
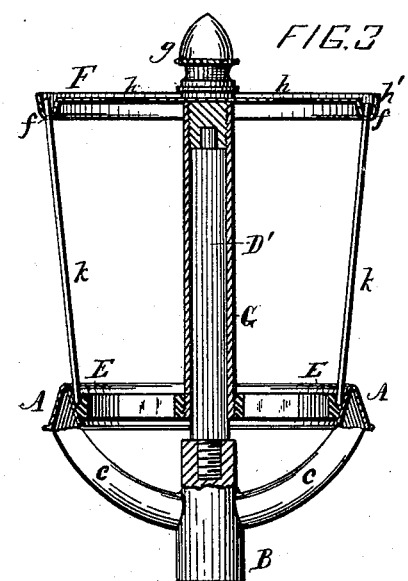
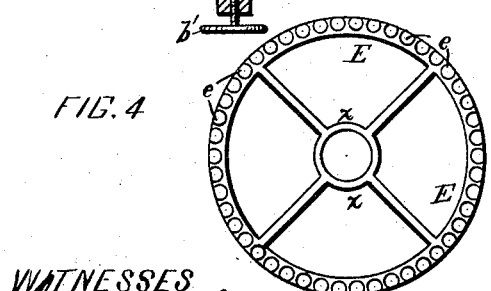
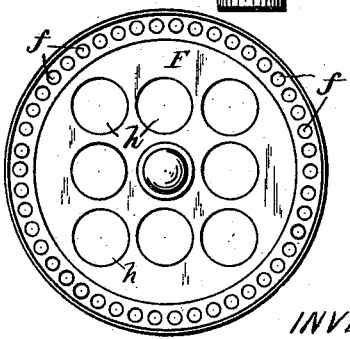
WITNESSES
J. Mawdsley
INVENTOR
John L. Stewart
By E. B. Clark
Atty.

United States Patent Office.

JOHN L. STEWART, OF PHILADELPHIA, PENNSYLVANIA, ASSIGNOR, BY MESNE ASSIGNMENTS, TO THE WELSBACH INCANDESCENT GAS LIGHT COMPANY, OF NEW JERSEY.

INCANDESCENT GAS-BURNER.

SPECIFICATION forming part of Letters Patent No. 417,524, dated December 17, 1889.

Application filed April 14, 1887. Serial No. 234,859. (No model.)

*To all whom it may concern*

Be it known that I, JOHN L. STEWART, a citizen of the United States, residing at Philadelphia, in the county of Philadelphia and State of Pennsylvania, have invented certain new and useful Improvements in Incandescent Gas-Burners; and I do hereby declare the following to be a full, clear, and exact description of the invention, such as will enable others skilled in the art to which it appertains to make and use the same.

This invention relates to gas-burners and their immediate connections for supporting incandescing material, constituting incandescent gas lamps or burners, in which brilliant illumination is produced by the combustion of gas alone, preferably the cheap uncarbureted water-gas, in contact with bodies that become readily incandescent, and particularly slender cylinders, rods, needles, or tubes of refractory compounds especially adapted for becoming incandescent in a non-luminous flame.

The objects of the invention are to provide improved means for supporting the incandescent cylinders, rods, or tubes in the most favorable position in the gas-flame, so that they will receive the greatest amount of heat and throw the light downward and outward, and thus secure the greatest candle-power and best light with a given consumption of gas; also, to provide for readily placing in position or removing together the whole number of rods or tubes, or removing and replacing any one of them when necessary without disturbing the others, since no cement or similar material is required to hold the rods or tubes in their supporting frame or cage; also, to provide improved means, as herein set forth, for economically heating the gas before it is brought in contact with the incandescent cylinders.

The construction and operation of my incandescent-burner lamp will now be particularly described with reference to the accompanying drawings, in which—

Figure 1 represents a perspective elevation of my incandescent gas-burner. Fig. 2 represents a vertical section showing the central gas-heater. Fig. 3 represents a vertical section with a central guide-post. Fig. 4 represents a plan view of the bottom tube-supporting ring of the basket or cage. Fig. 5 represents a plan view of the perforated cap-plate or disk for supporting the rods or tubes at the top.

An Argand burner A is used and is connected in the usual manner, by tubular arms $c$, with the socket C, which is preferably screw-threaded for connection with the gas-supply pipe B. A gas-heating tube C' extends above the burner and arms $c$, and is closed at the top. A central induction-tube D is secured in gas-pipe B, and extends centrally up within heater C', and at the top is provided with a contracted nozzle $m$, having a small jet-opening, and just below this nozzle the tube is provided with openings $n$, extending downward and outward through the walls of the tube for directing the current of gas downward through the outer heating-tube. I have found this construction of tube D with a nozzle and jet opening at top and the downwardly-inclined openings $n$ below the nozzle important and essential in order to secure a free and sufficient circulation of gas through the heater to the burner. Supply-pipe B is provided with a valve-box B', having a seat and a conical valve $b$, with a screw-threaded stem and thumb-disk $b'$. This valve has been found essential in order to prevent a blowing or hissing sound by the passing gas, and may be located at any convenient point between the key or cock and the burner.

The shade or globe holder $a$ rests upon the annular burner A, and is provided with spring-hooks $a'$ for supporting the glass cup $d$, which is provided with an outer turned-over edge and a central opening having an upwardly-turned rim. Cup $d$ is made of glass or wire-cloth, and serves to catch pieces of rods, cylinders, or tubes $k$ which may be accidentally broken, and prevents injury in case they should fall in heated condition. By removing the burner from gas-pipe B at the connection of socket C the cup may be placed over pipe B, and when the burner and shade-holder are adjusted it may be caught and supported by the hooks $a'$. It is preferably supported about half an inch below the burner, so as to permit the free flow of air to the latter.

The removable frame for supporting the incandescing rods or tubes is composed of the lower ring E, having hub $x$ and connecting-arms and the numerous small sockets or depressions $e\ e$ for receiving the ends of rods or tubes $k$, the upper disk F, and the connecting-sleeve G. The disk F is preferably of sheet metal stamped up with an annular groove $h'$, and having cut in it the ventilating-holes $h$. In the groove $h'$ the small holes $f$ are cut or punched for supporting the upper ends of the rods or tubes $k$. The top disk F is made of larger diameter than ring E, so that the rods or tubes, when in position, will flare outward from the burner, as shown, and thus throw the rays of light downward. The rods, cylinders, or tubes are also set at an inclination to the central post or tube, so as to cross its vertical axis at an acute angle, as shown in Fig. 1. When in position, they present the appearance of being spirally twisted from a vertical position, as well as flared outward. By means of this arrangement the flame hugs the incandescing rods or tubes better, so that the heat is better utilized and a greater candle-power or illuminating effect produced with a given consumption of gas. The cylinders, rods, or tubes are simply dropped loosely through the holes of disk F into the holes or sockets $e$ of ring E, resting upon their lower ends, and require no cement or other material to hold them in the frame. They can thus be separately removed and replaced, so that in case any one should become bent or broken a new one can be readily substituted for it without disturbing the others, thus securing economy and convenience of manipulation and use.

The entire frame carrying the rods or tubes can be removed and replaced when it is desired to clean the burner. The frame, with the rods or tubes in position, forms a cage or basket, which, when heated to incandescence in the flame of non-luminous water-gas, gives a brilliant white light of high candle-power.

I preferably use tubular rods $k$, as, on account of their thin walls with a comparatively large surface, they very quickly take on a brighter incandescence and yield more light with a smaller consumption of gas than would be the case with solid rods or pencils.

In Fig. 3 a central post $D'$, screwed into gas-pipe B, is used for supporting sleeve G of the frame. A screw-nut $g$ clamps disk F to the tube or post. The construction of the frame might be modified by omitting sleeve G and simply securing ring E in the burner-ring and clamping disk F to the heater tube or post; but this would not be so convenient to manipulate. I have found that with an open-ended inner tube D the gas would not flow freely and in sufficient quantity to the burner, and believe that the expanding gas and down-current at the top of the tube prevented the proper inflow through tube D, and to overcome this defect I provided the jet-nozzle $m$ and downwardly-inclined holes $n$, which have given satisfactory results. A disk of wire-gauze or glass might be placed in or on ring E, for catching pieces of rods or tubes, as a substitute for cup $d$.

Having described my invention, what I claim, and desire to secure by Letters Patent, is—

1. The combination, with a gas-burner, of an annular series of incandescent cylinders supported on their lower ends near the burner-tip and flaring outward above the burner in the path of the flame, substantially as described.

2. The combination, with a gas-burner, of an annular series of incandescent cylinders supported on their lower ends around and flaring outward above the burner and inclined sidewise across its vertical axis in the path of the flame, whereby the flame will better hug the cylinders and impart to them a bright incandescence, substantially as described.

3. The combination, with an Argand gas-burner, of the lower ring E, secured near the flame-passage, the upper disk or plate F, supported above the burner, and an annular series of incandescent cylinders supported by said ring and plate in position to be heated by the flame, substantially as described.

4. The combination, with a gas-burner, of the ring E, having an annular series of recesses or sockets $e$ and placed adjacent to the burner-tip, the disk or plate F, supported above the said ring and burner and having an annular series of perforations $f$, and the incandescent cylinders $k$, supported in said sockets and perforations, substantially as described.

5. The combination, with a gas-burner, of a removable frame comprising a lower ring E, an upper disk or plate F, and a connecting-tube G, and an annular series of incandescent cylinders supported by said ring and disk, substantially as described.

6. An incandescent gas-lamp comprising an Argand gas-burner, a vertical gas-heating tube $C'$, having a socket C, and radial tubular arms $c$, leading from said socket to the Argand burner, and the central gas-induction tube D, located in the gas-heating tube, and provided at its upper end with a contracted nozzle $m$ and an annular series of downward and outward inclined openings $n$, substantially as described.

In testimony whereof I affix my signature in presence of two witnesses.

JOHN L. STEWART.

Witnesses:
CHAS. MATHEWS, Jr.,
A. L. STEWART.